United States Patent [19]

Ignatowicz

[11] Patent Number: 5,094,544
[45] Date of Patent: Mar. 10, 1992

[54] SCANNING INFRARED THERMOMETER WITH DC OFFSET AND EMISSIVITY CORRECTION

[75] Inventor: Steven A. Ignatowicz, Wheeling, Ill.

[73] Assignee: Square D Company, Palatine, Ill.

[21] Appl. No.: 601,164

[22] Filed: Oct. 19, 1990

[51] Int. Cl.$^5$ .............................................. G01J 5/56
[52] U.S. Cl. .................................. 374/126; 374/124; 374/129; 356/43
[58] Field of Search .................. 374/5, 121, 124, 120, 374/126, 127, 128, 130, 129; 250/338.1, 342; 340/584, 600; 356/43 X, 45, 48; 358/82, 113

[56] References Cited

U.S. PATENT DOCUMENTS

| | | | |
|---|---|---|---|
| 3,777,568 | 12/1973 | Riogin et al. | 374/128 |
| 3,992,943 | 11/1976 | Schiefer et al. | 374/127 |
| 4,015,476 | 4/1977 | Roche et al. | 374/104 |
| 4,172,383 | 10/1979 | Iuchi | 374/126 X |
| 4,568,201 | 2/1986 | Noda | 374/120 X |
| 4,579,461 | 4/1986 | Rudolph | 374/126 X |
| 4,590,472 | 5/1986 | Benson et al. | 374/133 X |
| 4,607,963 | 8/1986 | Ulrickson | 374/134 X |
| 4,634,294 | 1/1987 | Christol et al. | 374/129 |
| 4,722,612 | 2/1988 | Junkert et al. | 374/208 X |
| 4,743,122 | 5/1988 | Yamano et al. | 374/121 X |
| 4,746,224 | 5/1988 | Mizuno et al. | 374/128 X |
| 4,764,025 | 8/1988 | Jensen | 374/128 X |
| 4,784,149 | 11/1988 | Berman et al. | 374/129 X |
| 4,840,496 | 6/1989 | Elleman et al. | 374/126 X |
| 4,854,730 | 8/1989 | Froden | 374/164 |
| 4,874,253 | 10/1989 | Pompei et al. | 374/121 |

FOREIGN PATENT DOCUMENTS

| | | | |
|---|---|---|---|
| 54-28606 | 9/1980 | Japan | 374/128 |
| 56-104226 | 8/1981 | Japan | 374/128 |
| 122923 | 9/1981 | Japan | 374/128 |

OTHER PUBLICATIONS

Donald R. Green, "Thermal and Infrared Nondestructive Testing of Composites and Ceramics", *Materials Evaluation*, vol. 29, No. 11, pp. 241-247 (Nov. 1971).

Primary Examiner—William A. Cuchlinski, Jr.
Assistant Examiner—G. Bradley Bennett
Attorney, Agent, or Firm—Michael J. Femal; James W. Potthast

[57] ABSTRACT

A scanning infrared sensor (10) in which the scanner (21), detector (32) and temperature converter (35) are all contained in proximity with one another in a single housing assembly (18) enables correction of both emissivity based on emissivity settings (41) for each of a plurality of spot targets (16') along a scan line (16) and correction for DC offset errors based on reference temperature measurement (45) of hot and cold references (34, 36). Correction is performed before digital conversion by an A/D converter (56) by a nulling circuit (46), a programmable gain circuit (50) and a bias circuit (62) to produce corrected digital temperature signals on a plurality of output ports (26) respectively associated to a plurality of spot targets (16') along a scan line (16) on a target (12) which are individually connectable with a multiple temperature display (27), a temperature recorder (28) and a process control (30).

77 Claims, 2 Drawing Sheets

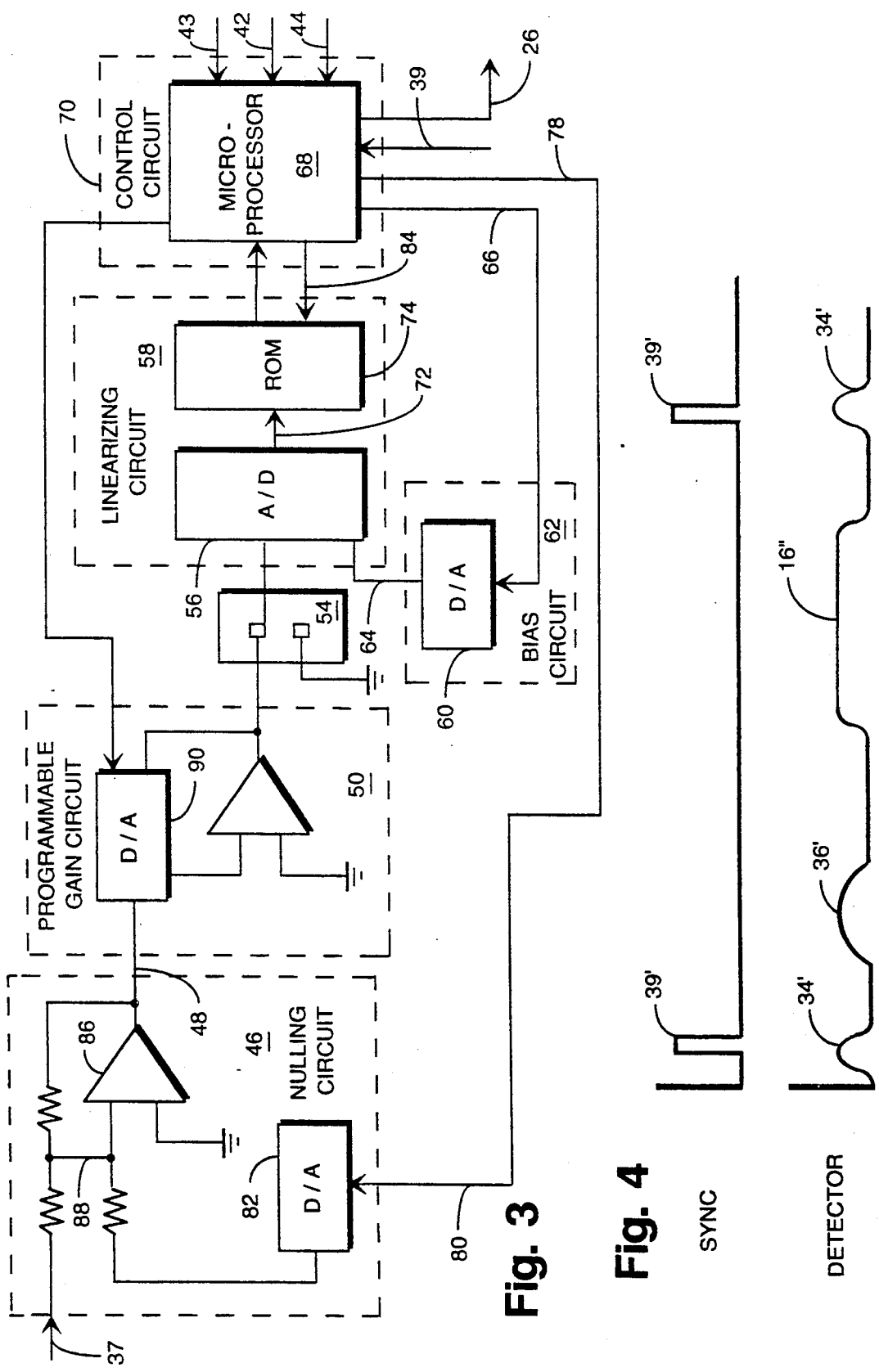

SCANNING INFRARED THERMOMETER WITH DC OFFSET AND EMISSIVITY CORRECTION

This invention generally relates to a scanning infrared thermometer and, particularly, to a scanning infrared thermometer with DC offset and emissivity correction.

Scanning infrared thermometers which scan a target for infrared radiation and average a plurality of infrared radiation samples from a plurality of points along a scan line on a target to determine the average radiation from a target are known. An optical system including a rotating reflective member collects light, such as infrared light, from the target, and a photoelectric detector converts the collected infrared radiation to an analog radiation signal representative of the magnitude of the radiation. After the analog radiation signals for a number of samples associated with the selected target are averaged, the average radiation for the selected target is converted to a representation of temperature.

In such scanners, it is also known to provide one or more reference sources of known temperatures, such as a relative cold reference at case or ambient temperature and a relatively hot reference source, also located in the scanning path. The radiation signal developed from these reference sources are used to make corrections in the conversion circuitry for DC offset variations and emissivity variations.

Accurate temperature measurement in infrared thermometry involves solving a complex equation. The output signal from the infrared detector is a function of not only the target temperature but also the wavelength of the energy reaching the detector, the emissivity of the target, the temperature of the detector, background energy reflections and other second order effects. The equation describing the detector output is defined by equation (1), below:

$$V = E \cdot C_1 \int_{\lambda_1}^{\lambda_2} \frac{\lambda^K}{(e^{C_2/\lambda T} - 1)} d\lambda + (1 - E) \cdot C_1 \int_{\lambda_1}^{\lambda_2} \frac{\lambda^K}{(e^{C_2/\lambda T_B} - 1)} d\lambda \quad (1)$$

where,
E is target emissivity;
$\lambda$ is wavelength;
K is power factor (5=thermal, 4=quantum);
T is target temperature;
$C_2$ is a constant (14388 for degrees in Kelvin);
$C_1$ is a detector scaling constant; and
$T_B$ is background temperatures reflecting off the target.

When $T_B$ is much lower than T the second term of equation (1) can be ignored. The problem faced by any system is to solve for T after measuring V.

Equation (1) can be restated in an abbreviated form as equation (2), below:

$$V = E \cdot C_1 \cdot F(T) + C_o \quad (2)$$

and then rearranged to form equation (3), below:

$$T = F^{-1}[(V - C_o)/(E \cdot C_1)] \quad (3)$$

Prior systems have solved equation (3) with multisegment linearizer circuits or even with look-up tables. These schemes have assumed fixed values for E, C and $C_o$. $C_1$ and $C_o$ depend on hot and cold reference targets which are not necessarily held constant. In a scanning system, the target emissivity E can change as a function of the scan angle, and product characteristics may cause the emissivity E to be different at different positions across the product. Regardless of the cause or reason for different values for emissivity E, it must be corrected in order to obtain an accurate solution to equation (3).

Systems are known which have used computers to calculate T for a specific spot in the product. However, in such computerized systems the calculations were so slow that multiple points could not be calculated in real time. Additionally, these digital computerized systems suffer from inaccuracy due to the fact that they correct for emissivity and circuit gain errors only after conversion of the analog radiation signal from the detector by an A/D converter. Consequently, for low emissivity values, the full range of the A/D converter is not utilized.

Another disadvantage of known scanning infrared thermometers is that the detector and conversion circuitry are not provided in proximity to each other, but are located in separate spaced housings which can cause substantial noise difficulties which precludes sending corrections for emissivity and DC offset errors back to the detector circuitry. Instead, correction is performed in the housing of the conversion circuitry which is connected to the detection circuitry by means of an elongated cable which is prone to pick up noise along its length.

SUMMARY OF THE INVENTION

It is therefore a principal object of the present invention to provide a scanning infrared thermometer with a conversion circuit which overcomes the aforementioned problems of known scanning infrared thermometers and more accurately corrects for DC offset and emissivity errors by providing all elements together in proximity in a single housing assembly and by correcting the DC offset and emissivity errors prior to conversion of the analog detection signal to digital form by providing a multitarget detector.

Specifically, it is an objective to provide a scanning infrared thermometer having an optical system for collecting light from a target and means including a photoelectrical detector for converting the collected light to an analog radiation temperature signal having a magnitude related to temperature with a correction circuit comprising means for altering the analog temperature signal to produce a corrected analog temperature signal in which errors due to emissivity are reduced including a reference and means for correcting for emissivity, and means responsive to the reference for automatically correcting for DC fluctuations prior to corrections by said emissivity correcting means, means including an analog to digital converter for converting the corrected analog temperature signal to generate a corresponding corrected digital temperature signal representative of the magnitude of the corrected analog temperature signal, and means responsive to the corrected digital temperature signal for displaying the temperature of the target.

Another objective is to provide a scanning infrared thermometer having a scanning optical system for collecting light from a target and means including a photoelectrical element for converting the collected light to an analog temperature signal with a magnitude related to temperature with a correcting circuit comprising means for altering the analog temperature signal to correct for DC offset errors from the detector to produce a corrected analog temperature signal, means including an analog to digital converter for converting the corrected analog temperature signal to generate a corresponding corrected digital temperature signal representative of the magnitude of the corrected analog temperature signal, and means responsive to the corrected digital temperature signal for displaying the temperature of the target.

Further, it is an objective to provide a scanning infrared thermometer having a scanning optical system for collecting light from a target and means including a photooptical detector for converting the collected light to an analog temperature signal with a magnitude related to the temperature of the target with a correcting circuit responsive to the analog temperature signal circuitry for producing a corrected analog temperature signal corrected for errors due to at least one of (a) variations in DC offset of the light converting means and (b) errors due to target emissivity, at least once per complete scan of the scanning optical system, a linearizing circuit responsive to the corrected analog temperature signal for producing a linearized, corrected temperature signal, a controller responsive to the linearized, corrected temperature signal for controlling the correcting circuit, a housing assembly for protectively enclosing together in proximity the correcting circuit, linearizing circuit and the controller, and an output interface. The output interface includes an output terminal mounted to and accessibly from the outside of the housing and means for producing a representation of the linearized, corrected temperature signal at said output terminal.

Yet, another objective of the invention is to provide a scanning infrared thermometer having a scanning optical system for collecting light from a target and a detector circuit including a photoelectrical device for converting the collected light to an analog temperature signal having a magnitude related to temperature with a correcting circuit comprising means for altering the analog temperature signal to correct for DC offset errors from the detector circuit to produce a corrected analog temperature signal, means for altering the magnitude of the analog temperature signal to correct for errors caused by at least one of emissivity effects, circuit stability and component variations, means including an analog to digital converter for converting the corrected analog temperature signal to a corresponding corrected digital temperature signal representative of the magnitude of the corrected analog temperature signal and means responsive to the corrected digital temperature signal for outputting the signal in digital format to at least one of a display, a recorder and process controller.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 3 is a circuit schematic of the converter circuit functional block of FIG. 2; and FIG. 4 illustrates comparative waveforms of some of the signals applied to the conversion circuit of FIG. 3.

DESCRIPTION OF THE PREFERRED EMBODIMENT

Figure 1:
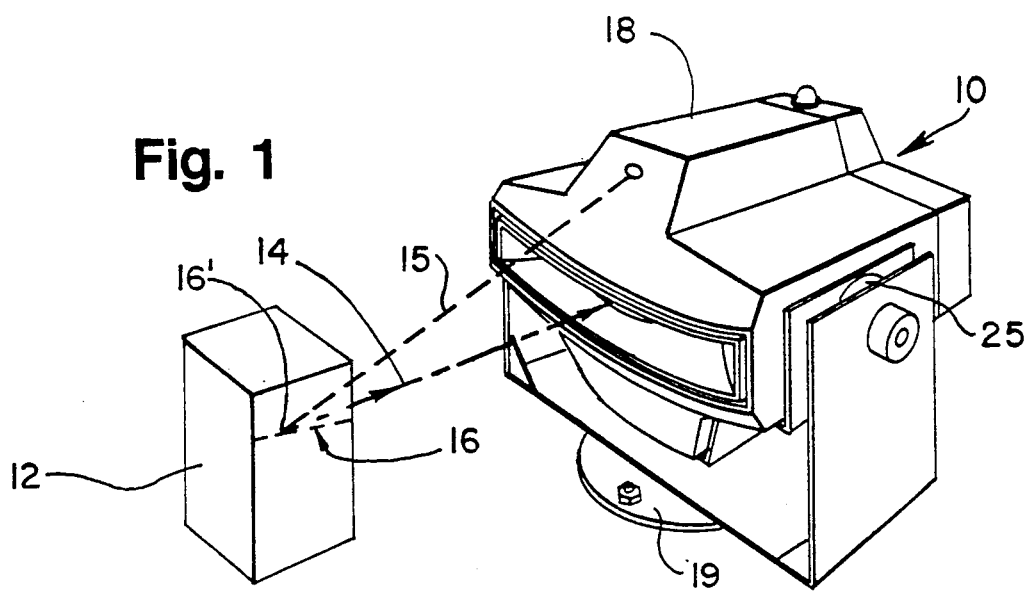
FIG. 1 is a perspective view of a preferred embodiment of the scanning infrared thermometer of the present invention.

Referring to FIG. 1, the preferred embodiment of the scanning infrared thermometer 10 of the present invention is scanning an exemplary target 12, such as a section of hot steel, plastic or glass being produced from an extrusion process, for infrared radiation along a sensing line or scanning line 16 on the target 12.

In the spot mode of operation, the temperature of each of a series of spot targets 16', or relatively short line segments along line 16, is individually determined. In a continuous mode of operation, the average temperature or temperature profile of the entire line 16 is determined.

The sensor has a single housing assembly 18 which is pivotally mounted on a vertical swivel assembly connected to a base 19 and mounted on a horizontal swivel assembly 25. The sensor 10 is moved on these swivels during aiming of the sensor 10. An alignment laser marks the target 12 with light at the precise location, or locations, on line 16 from which it is desired to sense the radiation of target 12 and determine the temperature. Control inputs, such as manual control inputs (not shown), enable an operator to select the number, length and relative location of each of the spot targets 16' after the line has been positioned on the target 12. These control inputs determine which of a plurality of radiation samples collected over the entire length of line 16 will be selected to individually determine the average radiation and average temperature of each of the spots 16'.

Figure 2:
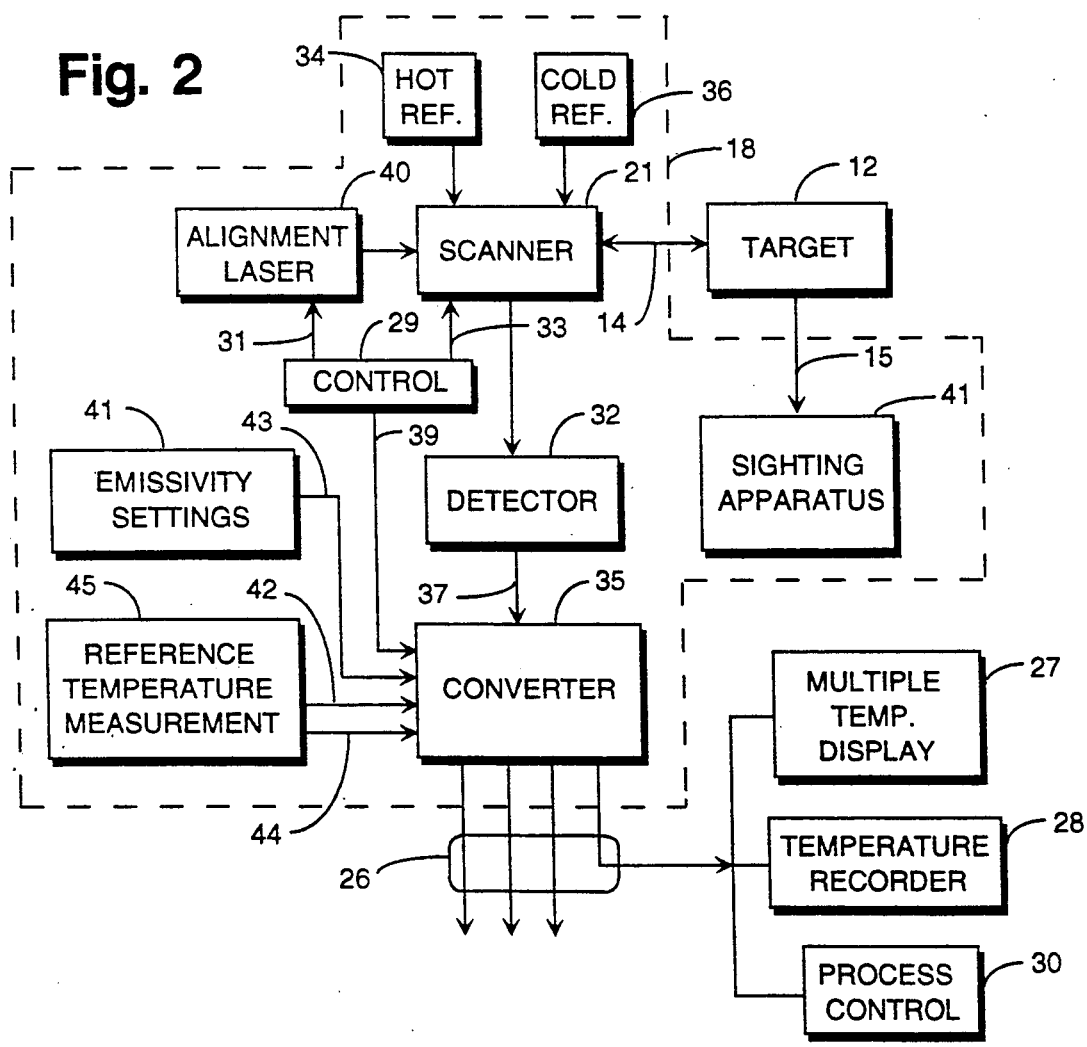
FIG. 2 is a general functional block diagram of the circuitry enclosed within the housing of the sensor of FIG. 1.

Referring to FIG. 2, in keeping with one objective of the invention, it is seen that all the elements of the sensor 10 are contained together in proximity within the housing 18. This includes a detector 32 having a photoconductor and a preamplifier which obtains the infrared light from a scanner 21. The scanner 21 has an optical system including a rotating mirror and a lens which focuses the light on the detector 32. The detector 32 converts the infrared light to an analog radiation temperature signal on output 37 having a magnitude related to temperature. The sensor 10 also includes within housing assembly 18 a scanner control 29 with an encoder for providing a sync signal on an output 39 which applied to a converter 35. The control 29 also provides a control signal on an output 33 to the scanner and on/off control signals on an output 31 to an alignment laser 40. The alignment laser 40 is directed through the scanner 21 to mark the spot targets 16' when aiming the sensor 10. A sighting apparatus 41 such as a filtered camera is used to enhance viewability of the light marks.

As seen in FIG. 4, the sync signal 39' is generated once during each revolution of the scanner 21, preferably when the scanner is receiving infrared light form, or "looking at", a hot reference 34, FIG. 2. Referring to FIG. 4, when this sync signal 39' is being generated, the detector 32 is producing an analog hot reference signal 34' having a magnitude related to the temperature of the hot reference, or hot reference source, 34, FIG. 2. Likewise, when the scanner 21 is looking at a cold reference, or cold reference source, 36, a cold reference signal 36' is generated having a magnitude related to the cold reference 36. Still referring to FIG. 4, when the scanner 21 is looking at the target 12 and collecting infrared light from along line 16, an analog radiation temperature signal 16" with a magnitude related to the temperature of the target 12 is produced on output 37 of the detector 32. The temperature of both the hot reference 34 and the cold reference 36 are independently measured by a reference temperature measurement circuit 45 which respectively provides those two reference temperature to the converter 35 on outputs 42 and 44. The converter 35 has a plurality of outputs, or output ports, 26 for providing digital signals representative of the temperature of the plurality of spot targets 16', respectively. Each of these output ports 26 are selectively connected to one or more of a multiple target temperature display 27, a target temperature recorder 28 and a process controller 30 for controlling the process which produces target 12. An emissivity settings circuit 41 provides emissivity settings on an output 43 to the converter 35 for each of the selected spot targets 16'.

Reference should be made to U.S. patent application Ser. No. 07/600643 of Kalley et al. entitled "Scanning Radiation Sensor For Multiple Spots And Apparatus And Methods Of Averaging Radiation Samples Of Same" filed contemporaneously herewith and assigned to the assignee of this application if further details of the sensor structure and means of correcting samples of radiation temperature are desired.

Referring now to FIG. 3, the converter 35 receives the analog temperature radiation signal on 37 and applies a correcting signal to a nulling circuit 46 when the scanner 21 is viewing the cold reference 36. The DC offset corrected analog radiation signal produced on the output 48 of the nulling circuit 46 is then applied to a programmable gain circuit 50 at which emissivity corrections are made. The DC offset corrected and emissivity corrected analog temperature radiation signal on an output 52 of the programmable gain circuit 50 is then applied through a sampling switch 54 which produces analog samples at a rate of approximately eighty kHz on an output 55. The samples on output 55 of the sampling switch 54 is applied to an input of an analog to digital, or A/D, converter 56 of a linearizing circuit 58. A D/A converter 60 of a bias circuit 62 applies an analog bias signal to another input 64 of the A/D converter 56. This bias signal is first provided to the bias circuit 62 in digital form on an output 66 of a microprocessor 68 of a control circuit 70. The A/D converter 56 produces a corrected digital temperature signal for each sample on its output 72 which is passed through a read only memory, or ROM, 74 which converts the signal to linearized temperature made available on output 76. The microprocessor 68 stores and makes available selected ones of these digital representations of temperature on the plurality of outputs 26. The microprocessor 68 also generates a DC offset correction signal on its output 78 which is applied to an input 80 of a D/A converter 82 of nulling circuit 46.

One of the objectives of the inventions is achieved by virtue of the microcomputer 68 responding to inputs from the emissivity settings circuit 41 which indicates the selected emissivity settings for each of the spot targets 16' to alter the preamplified analog radiation signal on output 37 from the detector 32, FIG. 2. The sync signal 39' indicates to the control circuit 70 when to sample the hot references signal 34' and the cold reference signal 36', FIG. 4. The control circuit 70 uses the reference signals 34' and 36' along with the desired emissivity settings on output 43 from the emissivity settings circuit 41 to adjust the nulling circuit 46 and the programmable gain circuit 50. The nulling circuit 46 is adjusted for each measurement sample, and the emissivity settings circuit 41 can provide each sample point with its own unique emissivity setting.

The microprocessor 68 controls biasing circuit 62 in response to the cold reference signal 36' to provide a cold reference temperature correction bias signal on its output 66 to the bias circuit 62. Advantageously, the ROM 74 is encoded with the linearizing, or temperature conversion, data in a direct look-up table format in a pair of look-up tables respectively associated with temperatures represented in Celsius and Fahrenheit degrees. The control circuit 70 selects which table to use on an output 84 according to an operator input (not shown). This provides the ability to get readings directly in Celsius or in Fahrenheit degrees. Preferably, a pass-through table in ROM 74 gives direct voltage readings which are needed for the reference signals 34' and 36'.

The purpose of the nulling circuit 46 is to make the output 48 of a preamp 86 be zero when the scanner 21 and, thus, the detector 32 is looking at the cold reference 36. The nulling voltage is preferably integrated over time to reduce noise effects according to the algorithm of equation (4):

$$VNULL_t = VNULL_{t-1} - VCOLD/N \qquad (4)$$

where N is the response time factor given by equation (5):

$$N = \tfrac{1}{2}(\text{Response Time/Sample Period} + 1.5) \qquad (5)$$

Seconds

The nulling voltage on output 78 is provided through the voltage output D/A converter 82 feeding a summing input 88 of the inverting opamp stage 86. The D/A converter 82 is preferably a conventional voltage output D/A converter, such as a DAC707 made by Burr Brown. The opamp 86 is preferably an OPA627 opamp made by Burr Brown.

Advantageously, the bias circuit 62 injects the ideal cold reference signal 34' back into the circuit independently of the emissivity settings. The actual cold reference temperature is measured with an independent sensor (not shown) of the reference temperature measurement circuit 42 which provides a representative signal on input 44 to the control circuit 70. The control circuit 70 uses the cold reference temperature to look up in a separate table in ROM 74 the desired voltage for the corresponding cold reference temperature. This signal is fed to the voltage output D/A converter 60 to provide the bias voltage at 64.

The programmable gain circuit 50 is used to inject both a hot reference correction signal and the emissivity setting for the sample point. The gain circuit 50 is adjusted for every sample point. The circuit is comprised of a multiplying D/A converter 90, preferably a DAC7541A converter made by Burr Brown and a high speed opamp 92, preferably an OPA627 opamp made by Burr Brown.

The hot reference temperature is measured with an independent sensor (not shown) which sends a signal to the control circuit 70 at input 42. The microprocessor 68 uses this hot reference signal to index a table in ROM 74 which gives the desired hot reference signal for the preamp 86. The ratio of the desired preamp signal and the actual preamp signal yields the necessary gain correction. The calculated gain correction is filtered with each successive scan to reduce noise effects. The algorithm for the correction factor (CF) is given by equation (6), as follows:

$$CF_t = CF_{t-1} + (CF_{t-1} - HREF/HVAL)/N \qquad (6)$$

where
HREF is the desired hot reference signal;
HVAL is the actual hot reference signal; and
N is the response time factor.

The programmable gain setting is calculated by equation (7) as follows:

$$PGS = CF_t/E_s \qquad (7)$$

where $E_s$ is the selected emissivity of the sample.

The A/D converter 56 is a fast (100 kHz) A/D converter with built in track and hold such as the AD779 made by Analog Devices and the ROM 74 is preferably a word wide ROM, such as a 27C210 made by Intel. The microprocessor 68 is preferably an 87C196 single chip microcomputer made by Intel. The nulling circuit 46, programmable gain circuit 50 and the bias circuit 62 circuitry prior to the A/D converter 56 is necessary for the direct look-up in the ROM 74 following the A/D converter 56 to yield the correct result. Advantageously, because the signal at 54 is always normalized before the A/D converter 56 the full resolution of the A/D converter 56 is maintained to yield higher accuracy than that which could be otherwise obtained.

While a detailed description of the preferred embodiment of the invention has been given, it should be appreciated that many variations can be made thereto without departing from the scope of the invention as set forth in the appended claims.

I claim:

1. In a scanning infrared thermometer having an optical system for collecting light from a target and means including a photoelectrical detector for converting the collected light to an analog radiation temperature signal having a magnitude related to temperature, the improvement being a correction circuit, comprising:
    means for altering the analog temperature signal to produce a corrected analog temperature signal in which errors due to emissivity are reduced including
        a reference, and
        means for correcting for emissivity;
    means responsive to the reference for automatically correcting for DC offset fluctuations prior to correction by said emissivity correcting means;
    means including an analog to digital converter for converting the corrected analog temperature signal to generate a corresponding corrected digital temperature signal representative of the magnitude of the corrected analog temperature signal; and
    means responsive to the corrected digital temperature signal for displaying the temperature of the target.

2. The scanning infrared thermometer of claim 1 in which said emissivity correcting means includes
    means for preselecting an emissivity setting according to the emissivity characteristics of a target, and
    means responsive to the preselected emissivity setting for altering the analog temperature signal to produce a corrected temperature signal corrected for different emissivity settings.

3. The scanning infrared thermometer of claim 2 including
    means for concurrently determining the temperature of a plurality of spots on a target, and in which
    said emissivity setting preselecting means includes means for individually preselecting an emissivity setting for each of the spots of the target.

4. The scanning infrared thermometer of claim 1 in which emissivity correcting means includes means for automatically, proportionately altering the magnitude of the analog temperature signal.

5. The scanning infrared thermometer of claim 4 in which said automatically, proportionably altering means includes
    a programmable gain circuit, and
    means for automatically controlling said programmable gain circuit to correct for circuit instability.

6. The scanning infrared thermometer of claim 4 in which said automatically, proportionately altering means includes
    a programmable gain circuit, and
    means for automatically controlling said programmable gain circuit to correct for component variations.

7. The scanning infrared thermometer of claim 4 in which said proportional altering means includes
    a programmable gain circuit connected between the detector and the analog to digital converter, and
    a controller responsive to changes in emissivity for selectively changing the gain of the programmable gain circuit.

8. The scanning infrared thermometer of claim 7 in which said DC fluctuations correcting means is connected between the detector and the proportionally altering means.

9. The scanning infrared thermometer of claim 1 in which said DC offset fluctuations correcting means includes
    a nulling circuit connected between the detector and the analog to digital converter, and
    a controller responsive to changes in emissivity for selectively changing the DC offset of the nulling circuit.

10. The scanning infrared thermometer of claim 1 in which said digital temperature signal generating means includes a memory encoded with linearizing data for producing a linearized and corrected digital temperature signal.

11. The scanning infrared thermometer of claim 10 in which said linearizing data is in a direct look-up table format.

12. The scanning infrared thermometer of claim 10 in which said memory is a static memory.

13. The scanning infrared thermometer of claim 10 in which said memory is encoded with data for selectively producing linearizing data for display of temperature selectively in Celsius degrees and Fahrenheit degrees.

14. The scanning infrared thermometer of claim 1 including a bias circuit for selectively biasing the analog to digital converter to selectively alter the corrected digital temperature signal in accordance with a relatively cold reference temperature signal.

15. The scanning infrared thermometer of claim 1 in which said corrected temperature signal producing means includes a controller responsive to at least one reference temperature signal circuit for changing at least one of the analog temperature signals in accordance with control signals from said controller.

16. The scanning infrared thermometer of claim 15 in which said controller is responsive to a relatively cold reference temperature signal.

17. The scanning infrared thermometer of claim 16 in which said controller is responsive to a relatively hot reference temperature signal.

18. The scanning infrared thermometer of claim 15 in which said controller is responsive to a relatively hot reference temperature signal.

19. The scanning infrared thermometer of claim 1 including
means for causing said optical system to scan for individual measurement of a plurality of discrete spots on a target, and
said emissivity correcting includes means for correcting for emissivity at least once per complete scan of the scanning means.

20. The scanning infrared thermometer of claim 19 in which the emissivity fluctuation correcting means includes means for correcting for fluctuations in emissivity individually for each spot per scan in accordance with preselected emissivity settings for such spot.

21. The scanning infrared thermometer of claim 1 including
a housing assembly for protectively enclosing in proximity the corrected analog temperature signal producing means and the corrected digital temperature signal generating means, and
an interface including a plurality of output ports connected with said corrected digital signal generating means and mounted to the housing for respectively receiving therefrom corrected digital temperature signals for a plurality of different spots.

22. The scanning infrared thermometer of claim 21 including means mounted within the housing assembly for linearizing the converted digital temperature signals for each spot.

23. The scanning infrared thermometer of claim 21 in which said temperature displaying means is mounted to the housing assembly.

24. The scanning infrared thermometer of claim 21 in which said housing assembly is formed of a single housing within which all of the corrected analog temperature providing means and the corrected digital temperature signal generating means are enclosed.

25. The scanning infrared thermometer of claim 24 in which
said analog temperature signal producing means includes means for concurrently providing corrected analog temperature signals for each of a plurality of samples for each of a plurality of spots on the target, and
said corrected digital temperature signal generating means includes means responsive to each of the corrected analog temperature signals for providing an average corrected digital temperature signal for each of said spots.

26. The scanning infrared thermometer of claim 1 in which
said analog temperature signal producing means includes means for concurrently providing corrected analog temperature signals for each of a plurality of samples for each of a plurality of spots on the target, and said corrected digital temperature signal generating means includes means responsive to each of the corrected analog temperature signals for providing an average corrected digital temperature signal for each of said spots.

27. In a scanning infrared thermometer having a scanning optical system for collecting light from a target and means including a photoelectrical element for converting the collected light to an analog temperature signal with a magnitude related to temperature, the improvement being a correcting circuit, comprising:
means for automatically altering the analog temperature signal to correct for DC offset errors from the detector to produce a first order corrected analog temperature signal;
means including an analog to digital converter for converting the corrected analog temperature signal to a corresponding corrected digital temperature signal representative of magnitude of the corrected analog temperature signal; and
means responsive to the corrected digital temperature signal for displaying the temperature of the target.

28. The scanning infrared thermometer of claim 27 in which said analog temperature signal altering means alters the analog signal in accordance with a reference signal.

29. The scanning infrared thermometer of claim 28 in which said altering means includes
a nulling circuit, and
means for controlling the nulling circuit to produce a null output when the optical system is sensing a reference target.

30. The scanning infrared thermometer of claim 29 in which said altering means includes means for introducing an offset to the input of the analog to digital converter.

31. The scanning infrared thermometer of claim 27 in which said altering means includes means for introducing an offset to the input of the analog to digital converter.

32. The scanning infrared thermometer of claim 27 including means for proportionately altering the magnitude corrected analog signal to further correct it for emissivity.

33. The scanning infrared thermometer of claim 27 in which said analog temperature altering means includes means for altering the DC offset in accordance with a relatively hot temperature reference signal.

34. The scanning infrared thermometer of claim 27 in which said digital temperature signal generating means includes a memory encoded with linearizing data for producing a linearized and corrected digital temperature signal.

35. The scanning infrared thermometer of claim 34 in which said linearizing data is in a direct look-up table format.

36. The scanning infrared thermometer of claim 34 in which said memory is a static memory.

37. The scanning infrared thermometer of claim 34 in which said memory is encoded with data for selectively producing linearizing data for display of temperature selectively in Celsius degrees and Fahrenheit degrees.

38. The scanning infrared thermometer of claim 27 in which said corrected temperature signal producing means includes a controller responsive to at least one reference temperature signal circuit for changing at least one of the analog temperature signals in accordance with control signals from said controller.

39. The scanning infrared thermometer of claim 38 in which said controller is responsive to a relatively cold reference temperature signal.

40. The scanning infrared thermometer of claim 39 in which said controller is responsive to a relatively hot reference temperature signal.

41. The scanning infrared thermometer of claim 38 in which said controller is responsive to a relatively hot reference temperature signal.

42. The scanning infrared thermometer of claim 27 including
means for causing said optical system to scan for simultaneous measurement of a plurality of discrete spots on a target, and
said corrected analog temperature signal producing means includes means for correcting for fluctuations in DC offset at least once per complete scan of the scanning means.

43. The scanning infrared thermometer of claim 27 including
a housing assembly for protectively enclosing in proximity the corrected analog temperature signal providing means and the corrected temperature digital temperatures signal generating means, and
an interface having a plurality of output ports connected with said corrected digital signal generating means and mounted to the housing for respectively receiving therefrom corrected digital temperature signals for the plurality of spots.

44. The scanning infrared thermometer of claim 43 including means for linearizing the converted digital temperature signals for each spot mounted within the housing.

45. The scanning infrared thermometer of claim 44 in which said temperature displaying means is mounted to the housing.

46. In a scanning infrared thermometer having a scanning optical system for collecting light from a target and means including a photoptical detector for converting the collected light to an analog temperature signal with a magnitude related to the temperature of the target, the improvement, comprising:
a correcting circuit responsive to the analog temperature signal circuitry for producing a corrected analog temperature signal corrected for errors due to at least one of (a) variations in DC offset of the light converting means and (b) errors due to target emissivity, at least once per complete scan of the scanning optical system;
a linearizing circuit responsive to the corrected analog temperature signal for producing a linearized corrected digital temperature signal;
a controller responsive to the linearized, corrected temperature signal for controlling the correcting circuit;
a housing assembly for protectively enclosing together in proximity the correcting circuit linearizing circuit and the controller; and
an output interface including
an output terminal mounted to and accessibly from the outside of the housing, and
means for producing a representation of the linearized, corrected temperature signal at said output terminal in digital form.

47. The scanning infrared thermometer of claim 46 in which said correcting circuit corrects for both emissivity errors and DC offset errors.

48. The scanning infrared thermometer of claim 46 in which said correcting circuitry includes a nulling circuit responsive to a relatively cold reference signal to correct for zero offset errors.

49. The scanning infrared thermometer of claim 46 in which said correcting circuitry includes a programmable gain circuit responsive to different emissivity settings for different locations on the target to proportionally alter the magnitude of the analog temperature signal for each said different location.

50. The scanning infrared thermometer of claim 46 including
means for producing a corrected, linearized digital temperature signals for a plurality of different spots on the target, and in which
said output interface has a plurality of input-output parts for receiving the corrected, linearized digital temperature signals for said plurality of spots, respectively.

51. The scanning infrared thermometer of claim 46 in which said controller includes means for selecting different emissivity settings for different ones of said spots on the target where temperature is being measured.

52. In a scanning infrared thermometer having a scanning optical system for collecting light from a target and a detector circuit including a photoelectrical device for converting the collected light to an analog temperature signal having a magnitude related to temperature, the improvement being a correcting circuit, comprising:
means for altering the analog temperature signal to correct for DC offset errors from the detector circuit to produce a corrected analog temperature signal;
means for altering the magnitude of the analog temperature signal to correct for magnitude errors caused by at least two of emissivity effects, circuit stability and component variations;
means including an analog to digital converter for converting the corrected analog temperature signal to a corresponding corrected digital temperature signal representative of the magnitude of the corrected analog temperature signal; and
means responsive to the corrected digital temperature signal for outputting the signal in digital format to at least one of a display, a recorder and a process controller.

53. The scanning infrared thermometer of claim 52 in which said offset correcting means alters the analog signal in accordance with the reference signal.

54. The scanning infrared thermometer of claim 52 in which said offset correcting means includes
a nulling circuit, and
means for controlling the nulling circuit to produce a null output prior to an input to the analog to digital converter when the optical system is sensing a relatively cold reference target, and
means to introduce an offset signal at an input of the analog to digital converter which is generated in response to an independent temperature signal from the cold reference target.

55. The scanning infrared thermometer of claim 54 in which the analog termination signal magnitude adjusting means includes a programmable gain amplifier responsive to the controlling means responsive to an emissivity reference.

56. The scanning infrared thermometer of claim 55 in which the controlling means is also responsive to a relatively hot temperature reference target.

57. The scanning infrared thermometer of claim 55 in which said digital temperature generating means includes a memory encoded with linearizing data for producing a linearized and corrected digital temperature signal.

58. The scanning infrared thermometer of claim 57 in which said linearizing data is in a direct look-up table format.

59. The scanning infrared thermometer of claim 58 in which said memory is encoded to produce temperature readings selectively in standard temperature scales of degrees Celsius and degrees Fahrenheit.

60. The scanning infrared thermometer of claim 59 in which said memory includes address lines which are connected directly to digital converter data output lines.

61. The scanning infrared thermometer of claim 60 in which the controlling means is also responsive to a relatively hot temperature reference target when in view of the optical system.

62. The scanning infrared thermometer of claim 61 in which the controlling means is also responsive to an independent temperature signal from the hot reference target.

63. The scanning infrared thermometer of claim 60 where the controlling means integrates the cold reference readings over successive scan cycles to reduce system noise while controlling the nulling circuit.

64. The scanning infrared thermometer of claim 63 in which the controller and programmable gain amplifier are responsive to a plurality of emissivity settings along the scan line.

65. The scanning infrared thermometer of claim 64 in which the controlling means is also responsive to a relatively hot temperature reference.

66. The scanning infrared thermometer of claim 65 where the controlling means integrates the hot reference readings over successive scan cycles to reduce a system noise while controlling the programmable gain circuit.

67. The scanning infrared thermometer of claim 65 in which the controlling means is also responsive to an independent temperature signal from the hot reference target.

68. The scanning infrared thermometer of claim 67 the improvement being means to select discrete measurement spots from a thermal image including a controller to select samples during successive scans into at least one composite measurement, and means to output the composite measurements.

69. The scanning infrared thermometer of claim 68 in which the optical system, correcting means, and output means are contained in a single protective housing assembly.

70. The scanning thermometer of claim 69 including means to output the composite measurement as an analog signal.

71. The scanning thermometer of claim 70 including means to output a discrete binary signal respectively representing the composite measurement being above and below a reference setpoint.

72. The scanning infrared thermometer of claim 65 in which the controlling means is responsive to an independent hot temperature reference signal.

73. The scanning infrared thermometer of claim 64 including means to pick out discrete measurement spots from a thermal image including computing means to select samples along successive scan lines to determine one or more composite measurements, and means to output the composite measurements.

74. The scanning infrared thermometer of claim 73 in which the optical system, correcting means, and output means are contained in a single protective housing assembly.

75. The scanning thermometer of claim 73 including means to output the composite measurements as an analog signal.

76. The scanning infrared thermometer of claim 75 including means to output a discrete binary signal respectively representing the composite measurement being above and below a reference setpoint.

77. The scanning infrared thermometer of claim 54 in which the controller and programmable gain amplifier are responsive to a plurality of emissivity settings along the scan line.

* * * * *